United States Patent
Rimann et al.

(10) Patent No.: US 9,467,079 B2
(45) Date of Patent: Oct. 11, 2016

(54) POWER SUPPLY SYSTEM FOR A DIRECT-CURRENT DRIVE AND METHOD FOR SAFETY-RELATED DISCONNECTION OF A DIRECT-CURRENT DRIVE

(71) Applicant: ABB AG, Mannheim (DE)

(72) Inventors: Eberhard Rimann, Heppenheim (DE); Christian Schleger, Mannheim (DE); Ludwig Werle, Heidelberg (DE)

(73) Assignee: ABB AG, Mannheim (DE)

( * ) Notice: Subject to any disclaimer, the term of this patent is extended or adjusted under 35 U.S.C. 154(b) by 60 days.

(21) Appl. No.: 14/606,622

(22) Filed: Jan. 27, 2015

(65) Prior Publication Data

US 2015/0214877 A1    Jul. 30, 2015

(30) Foreign Application Priority Data

Jan. 27, 2014   (EP) .................................. 14 000 279

(51) Int. Cl.
  *H02H 7/08*   (2006.01)
  *H02P 7/292*  (2016.01)
  *H02P 3/08*   (2006.01)

(52) U.S. Cl.
  CPC ................. *H02P 7/292* (2013.01); *H02P 3/08* (2013.01); *H02P 29/0241* (2016.02)

(58) Field of Classification Search
  CPC ...... H02K 15/125; H02K 26/00; A47H 5/02; A47H 5/0325; A63F 13/06; H02P 6/14; H02P 6/001; H02P 6/12; H02P 6/22; H02P 6/002; H02P 6/16; H02P 29/02; H02H 7/093; H02H 7/0833
  USPC .............. 318/434, 563, 400.21, 400.22, 782; 363/50, 56.03, 56.04, 56.05, 56.07, 363/56.08, 56.11; 361/1, 18, 23, 824, 534
  See application file for complete search history.

(56) References Cited

U.S. PATENT DOCUMENTS

2008/0061721 A1* 3/2008 Schwesig ................ H02P 27/06
                                            318/434
2010/0309589 A1* 12/2010 Ueki ....................... H02M 1/32
                                            361/18
2014/0111128 A1* 4/2014 Hensel ...................... H02P 3/18
                                            318/400.21
2014/0139159 A1* 5/2014 Sato ........................ H02M 1/32
                                            318/400.22

FOREIGN PATENT DOCUMENTS

EP           2 220 757 B1    12/2011

OTHER PUBLICATIONS

Peter Wratil Ed—Anonymous: "Technology of safe Drives", Industrial Informatics, 2007 5th IEEE International Conference on, IEEE, PI, Jul. 1, 2007, Seiten 155-161, XP031161785, ISBN: 978-1-4244-0850-4.*

Peter Wratil Ed—Anonymous: "Technology of safe Drives", Industrial Informatics, 2007 5TH IEEE International Conference on, IEEE, PI, Jul. 1, 2007 (Jul. 1, 2007), Seiten 155-161, XP031161785, ISBN: 978-1-42440850-4.*

* cited by examiner

*Primary Examiner* — Jorge L Carrasquillo

(74) *Attorney, Agent, or Firm* — Buchanan Ingersoll & Rooney PC

(57) ABSTRACT

An exemplary power supply system for a direct-current drive includes a power converter for at least one direction-dependent two-quadrant operating mode, at least one associated pulse-based actuation device, an input-side connection and an output-side connection for the power converter, and at least one mechanical interruption device for the input-side connection and/or the output-side connection. The power supply system is provided to continually provide values of a current flowing on the output-side during operation by receiving an STO (safe torque off) signal, immediate changeover of the power converter operating mode into the inverter limitation if an STO signal is received, interrupting a feed of actuation power through the actuation device into the power converter, and supplying an interruption signal to the at least one mechanical interruption device once a second subsequent time interval has elapsed and the current flowing on the output side has not decayed below a safety-critical limit value.

7 Claims, 1 Drawing Sheet

POWER SUPPLY SYSTEM FOR A DIRECT-CURRENT DRIVE AND METHOD FOR SAFETY-RELATED DISCONNECTION OF A DIRECT-CURRENT DRIVE

RELATED APPLICATION(S)

This application claims priority under 35 U.S.C. §119 to European application 14000279.1 filed in Europe on Jan. 27, 2014, the entire content of which is incorporated by reference.

FIELD

The present disclosure relates to a power supply system for a direct-current drive, including a power converter for at least one direction-dependent two-quadrant operating mode, at least one associated pulse-based actuation device, an input-side connection and an output-side connection for the power converter, at least one mechanical interruption device for the input-side connection and/or the output-side connection, wherein the power supply system is provided to continually provide values of a current flowing on the output side during operation. The present disclosure also relates to a method for safety-related disconnection of a direct-current drive in such a power supply system.

BACKGROUND INFORMATION

Known direct-current drives can be operated by power converters which are either supplied by an AC voltage source or from a DC voltage source. A variable direct current is generated by a power converter which is usually operated via phase gating control, by which variable direct current the direct-current drive can be operated according to the respective specifications. One example for a power converter is a B6 bridge populated with thyristors. Industrial direct-current drives have, for example, a nominal voltage in the range of up to 1500 V at an electrical power of up to 20 MVA, wherein, depending on the application, characteristic variables which deviate significantly therefrom can also occur.

In the event of a safety-related disconnection of a direct-current drive, care should be taken that the driving moment thereof becomes zero as quickly as possible in order to promptly exclude the risk of possible danger. For this purpose, it is sufficient that either the armature current or the field current has decayed to zero. Such a functionality is usually referred to as a safe torque off (STO) function. A reduction in the armature current, which is fed in by the power converter, is of particular interest in this connection.

Because a grid-supplied power converter cannot be immediately de-energized, at least in the case of a high output voltage during regenerative operation (during braking of the direct-current machine), a corresponding time period is called for, in which the current can be reduced. A corresponding time period which is the maximum permissible in terms of safety from giving a signal to commence the STO function until reducing the torque of the direct-current drive to a value of zero is, for example, in the range from 500 ms to 1000 ms, depending on the respective boundary conditions.

According to known implementations, when an STO signal is given, the output voltage of the armature power supply is adjusted such that the current becomes smaller as quickly as possible and the armature current can be reduced within the stated exemplary time interval. After said interval has elapsed, the power converter is then decoupled from the direct-current drive and/or the power converter is decoupled from its infeed by a mechanical interruption device, for example a contactor. By way of example, patent document EP 2220757 B1 likewise relates to said problem.

Here, it proves to be disadvantageous that—in particular in the relatively high power range, mentioned at the outset, of the direct-current drives—the maximum permissible number of switching cycles of mechanical interruption devices before said devices should be exchanged or at least maintained is relatively small. Depending on the frequency of initiation of a safe torque off (STO) function during operation, it is possible for excessive wear on the interruption devices to occur.

SUMMARY

An exemplary power supply system for a direct-current drive is disclosed, comprising: a power converter for at least one direction-dependent two-quadrant operating mode; at least one associated pulse-based actuation device, an input-side connection and an output-side connection for the power converter; at least one mechanical interruption device for at least one of the input-side connection and the output-side connection, wherein the power supply system is provided to continually provide values of a current flowing on the output side during operation, and the power supply system is configured to: receive a safe torque off signal, after receiving the safe torque off signal, immediately adjust the output voltage of the power converter such that the current flowing on the output side is brought down to zero or at least below a safety-critical limit value close to zero already within a first time interval, once the first time interval, which begins when the STO signal is received, has elapsed, at least one of interrupting the output of pulses to the power converter and interrupting the output of a current-direction signal to the power converter, with the result that a feed of actuation power through the actuation device into the power converter is interrupted, and supply an interruption signal to the at least one mechanical interruption device once a second subsequent time interval has elapsed and the current flowing on the output side has not decayed below a safety-critical limit value.

An exemplary method for safety-related disconnection of a direct-current drive in a power supply system is disclosed, the power system being arranged for a direct-current drive having a power converter for at least one direction-dependent two-quadrant operating mode with pulse-based actuation device, an input-side connection and an output-side connection for the power converter, at least one mechanical interruption device for at least one of the input-side connection and the output-side connection, wherein the power supply system is provided to continually provide values of the current flowing on the output side, and wherein a direct-current drive is connected to the power converter on the output side and is operated by said power converter, and the method comprising: receiving a safe torque off (STO) signal; in the event of receiving a safe torque off (STO) signal, immediately adjusting the output voltage of the power converter such that the current flowing on the output side is brought down to zero or at least below a safety-critical limit value close to zero already within a first time interval; once the first time interval, which begins when the STO signal is received, has elapsed, at least one of interrupting the output of pulses to the power converter and interrupting the output of a current-direction signal to the power converter, with the result that a feed of actuation power through the actuation device into the power converter is interrupted; and supplying an interruption signal to the at least one mechanical interruption device for precisely the case in which, once a second subsequent time interval has elapsed, the current flowing on the output side has not decayed below a safety-critical limit value.

BRIEF DESCRIPTION OF THE DRAWINGS

The claimed disclosure, further embodiments and further advantages are to be described in more detail on the basis of the exemplary embodiments illustrated in the drawings, in which:

DETAILED DESCRIPTION

Figure 1:
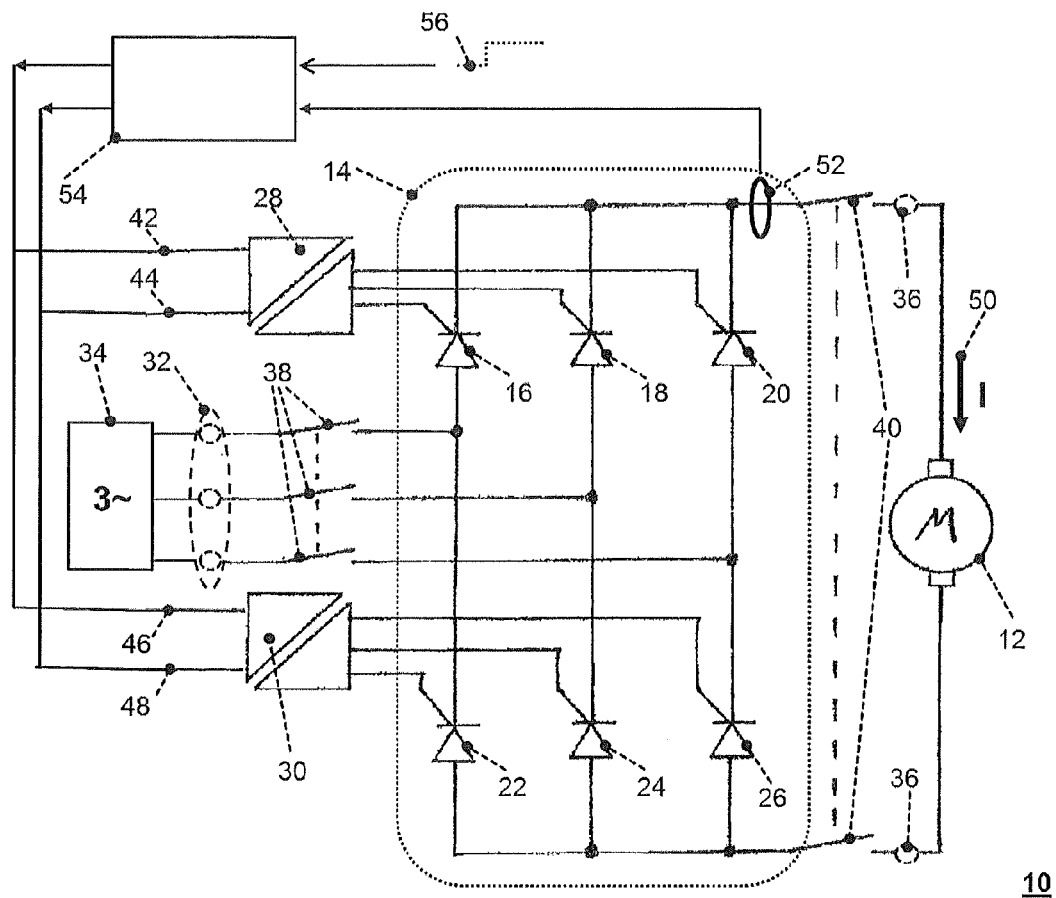
FIG. 1 shows a power supply system for a direct-current drive in accordance with an exemplary embodiment of the present disclosure.

In contrast to the known implementations, exemplary embodiments of the present disclosure provide a power supply system for a direct-current drive and a corresponding method for safety-related disconnection of a direct-current drive, which avoids the above-described disadvantage.

Exemplary embodiments described herein include a power supply system for a direct-current drive of the type mentioned at the outset. Said power supply system is wherein it is provided to perform the following steps: receiving an STO (safe torque off) signal, immediate changeover of the power converter operating mode into the inverter limitation if an STO signal is received, once a first time interval, which begins when the STO signal is received, has elapsed, interrupting a feed of actuation power through the actuation device into the power converter, and supplying an interruption signal to the at least one mechanical interruption device for precisely the case in which, once a second subsequent time interval has elapsed, the current flowing on the output side has not decayed below a safety-critical limit value.

According to an exemplary embodiment of the present disclosure, the current flowing on the output side can be brought to zero or at least below a safety-critical limit value close to zero already within the first time interval by a suitably adjusted output voltage of the power converter. Such an actuation variant of the power converter is referred to as inverter limitation.

Depending on external boundary conditions, in particular during regular operation of the direct-current drive, it is to be expected that this will be achieved within the first time interval of, for example, 300 ms. Therefore, according to exemplary embodiments of the present disclosure, in the event of a successful reduction of the output-side current or the driving moment already within the first time period, switching of the mechanical interruption devices is deliberately dispensed with, without in this case compromising safety-related aspects.

However, in the event of a fault, for example a short-circuit with correspondingly increased short-circuit current and possible inverter instability connected therewith, it cannot be assumed that the current flowing on the output side has decayed to zero or at least close to zero within the safety-critical time interval which is ultimately composed of the sum of the first and second time intervals and is, for example, 500 ms.

Nevertheless, in order to meet all safety-related specifications, exemplary embodiments of the present disclosure provide for decoupling the power converter from the direct-current drive and/or from the supplying grid by actuating the interruption device(s) after the second time interval has elapsed, as long as the output-side current has not yet decayed below the safety-critical limit value.

In principle, the second time interval can be configured to be as short as desired; however, it should be noted that the provision of reliable values of a current flowing on the output side during operation likewise can call for a particular time period. In order to very reliably exclude possible misidentifications of such a value, the current profile should ideally be considered over a particular time period, for example 10 ms or 20 ms when calculating a respective value.

By way of example, a computation device can be used for the technical realization of such a functionality, which computation device is provided to receive a respective STO signal, to evaluate the continually provided current values and, if specified, to influence the actuation device and/or also to initiate a disconnection of the interruption devices. Such a computation device can be implemented, for example, as an additional plug-in circuit board in known controller for a direct-current drive or, optionally, as additional software function of such a controller which operates using the existing hardware of the known controller.

According to exemplary embodiments described herein, the computation device can include one or more of any known general purpose processor or integrated circuit such as a central processing unit (CPU), microprocessor, field programmable gate array (FPGA), Application Specific Integrated Circuit (ASIC), or other suitable programmable processing or computing device or circuit as desired. The processor(s) can be configured to include and perform features of the exemplary embodiments of the present disclosure such as, a method for safety-related disconnection of a direct-current drive in a power supply system. The features can be performed through program code encoded or recorded on the processor(s), or stored in a non-volatile memory device, such as Read-Only Memory (ROM), erasable programmable read-only memory (EPROM), or other suitable memory device or circuit as desired. In another exemplary embodiment, the program code can be provided in a computer program product having a non-transitory computer readable medium, such as Magnetic Storage Media (e.g. hard disks, floppy discs, or magnetic tape), optical media (e.g., any type of compact disc (CD), or any type of digital video disc (DVD), or other compatible non-volatile memory device as desired) and downloaded to the processor(s) for execution as desired, when the non-transitory computer readable medium is placed in communicable contact with the processor(s).

Hence, according to exemplary embodiments of the present disclosure, mechanical actuation of the interruption devices is avoided as long as it is not relevant to safety. The number of switching cycles occurring during operation is therefore advantageously reduced.

According to an exemplary embodiment of the power supply system according to the present disclosure, a measuring device for detecting a respective first characteristic variable for the current flowing on the output side is provided on the output side. Such a measuring device can be, for example, a current measuring device, which measures a voltage drop across a nonreactive measuring resistor through which the current to be measured flows. An output-side measurement of the output-side current is a simple determination method for this, which is subject to fewer fault tolerances.

In accordance with another exemplary embodiment of the power supply system according to the present disclosure, a measuring device is provided on the input side, it being possible to determine a respective second characteristic variable for the current flowing on the output side on the basis of the measured values of said measuring device. Thus, for example, on the basis of an input-side three-phase alternating current measurement, it is possible to infer an output-side direct-current value. A decay of the driving moment which has already occurred can also be inferred if no active power, or only an active power which covers the electrical losses of the power converter, is still being supplied to the power converter on the input side.

According to yet another exemplary embodiment of the present disclosure, a logic AND operation of a respective undershoot of first and second characteristic variables is used as criterion for a decay of the current flowing on the output side below the safety-critical limit value. In order for the interruption device not to be triggered, both the first and the second characteristic variable should have decayed below the safety-critical value. Although, ideally, first and second characteristic variables correspond, owing to such a redundancy or diversity of different calculation methods, the reliability of the system is however increased further. Of course, a combination of any other characteristic variables which describe the current flowing on the output side is also conceivable.

According to another exemplary embodiment of the present disclosure, the immediate interruption of a feed of actuation energy to the power converter through the actuation device is effected by an interruption of the provision of pulses to the power converter and/or by an interruption of the provision of a current-direction signal to the power converter. In the case of pulse-based power converters, the actuation signals of the semiconductor switches are formed from current-direction signals and pulses, in each case corresponding to their phase angle. Only when current-direction signals and pulses are present simultaneously is it possible to actuate the semiconductor switches. If at least one of said two signals is not present, the semiconductor switches are not actuated and hence no supply of actuation energy occurs either.

According to an exemplary power supply system of the present disclosure, the power converter is provided for a four-quadrant operating mode. A four-quadrant operating mode enables a motor and generator operating mode of the drive device in both possible directions of rotation and is therefore particularly flexible.

According to another exemplary embodiment described herein, the decay of the current flowing on the output side below the safety-critical limit value is identified on the basis of voltage measurements across the semiconductor switches of the power converter. If, for example, a respective voltage is present across all of the semiconductor switches simultaneously for a time period, it can thus be concluded that none of the semiconductor switches are conducting, no current is flowing through them and hence also no current is flowing on the output side.

In yet another exemplary embodiment, the power supply system can be provided on the input side for a three-phase infeed. Power distribution grids are very often embodied as three-phase alternating-current grids to which a three-phase power supply system can then easily be connected. In this case, the power converter can additionally be embodied in a particularly advantageous manner as a B6 bridge. However, it goes without saying that variants with single-phase infeed or with a direct-current intermediate circuit are also conceivable.

According to another variant of the power supply system, said power supply system is provided to receive and to take into account two or even more mutually independent STO signals. This condition can take place on independent channels of the power supply system, with the result that a redundancy is thus formed, which further increases the operational reliability.

According to another exemplary embodiment of the present disclosure, the first time interval is in the range from 50 ms to 500 ms. For reasons of safety, the lower limit for said time interval should firstly be as low as possible such that disconnection can occur as quickly as possible. Secondly, however, enough time should be provided that an output-side direct current can already be decayed with a greater probability once an STO signal has been received owing to the subsequent adjustment of the power converter operation into the inverter limitation.

The upper limit of the first time interval emerges in total with the second time interval for safety-related considerations—how long a disconnection of a respective direct-current drive can last at maximum. The specified time range is suitable for most application cases; however, depending on given boundary conditions, values which deviate therefrom are also conceivable and meaningful.

Exemplary embodiments of the present disclosure address these problems by providing a method for safety-related disconnection of a direct-current drive in a power supply system for a direct-current drive, including a power converter for at least one direction-dependent two-quadrant operating mode with pulse-based actuation device, an input-side connection and an output-side connection for the power converter, at least one mechanical interruption device for the input-side connection and/or the output-side connection, wherein the power supply system is provided to continually provide values of the current flowing on the output side, wherein a direct-current drive is connected to the power converter on the output side and is operated by said power converter, consisting of the following steps: receiving an STO (safe torque off) signal, immediate changeover of the power converter operating mode into the inverter limitation if an STO signal is received, once a first time interval, which begins when the STO signal is received, has elapsed, interrupting a feed of actuation power through the actuation device into the power converter, and supplying an interruption signal to the at least one mechanical interruption device for precisely the case in which, once a second subsequent time interval has elapsed, the current flowing on the output side has not decayed below a safety-critical limit value.

The advantages of the exemplary method of the present disclosure correspond to the above-mentioned advantages of the exemplary power supply system described herein. Accordingly, what is achieved is that, when an STO signal is received, the interruption devices are only switched if this is also specified for reasons of safety. As a result, the number of switching cycles of the interruption devices which occurs during operation is advantageously reduced.

FIG. 1 shows a power supply system for a direct-current drive in accordance with an exemplary embodiment of the present disclosure. As shown in FIG. 1 the exemplary power supply system 10 for a direct-current drive 12 includes a power converter 14, in this case a B6 bridge circuit with 6 semiconductor switches 16, 18, 20, 22, 24, 26 that forms the core of the power supply system. The power converter 14 is supplied via an input-side three-pole connection 32 (which may include an input-side three-phase alternating current measurement device) from a three-phase power supply grid 34, which has a nominal voltage of 1 kV, for example. The direct-current drive 12 is connected to the power converter 14 on the output side via an output-side connection 36. A three-pole interruption device 38 is provided on the input side for electrical isolation of the power converter 14 from the power supply grid 34. A two-pole interruption device 40 is provided on the output side for electrical isolation of the power converter 14 from the direct-current drive 12.

The semiconductor switches 16, 18, 20, 22, 24, 26 of the power converter 14 are actuated by respective parts 28, 30 of an actuation device. The trigger pulses are generated from a respective pulse signal and a current-direction signal. In this example, said signals are provided to the parts 28, 30 of the actuation device via the inputs 44, 48 or 42, 46 thereof by a computation device 54. The computation device 54 is a controller by virtue of which a multiplicity of the functionalities specified for operating the drive device are realized.

In addition to a plurality of functionalities which can be used in terms of control but are not indicated in this figure, the computation device 54 is also provided to receive a safe torque off signal 56 which can be output, for example, by an emergency stop circuit-breaker. In the event of a safe torque off signal being given, a time function for a first time interval is started and the reduction in current is commenced by predefining the inverter limitation, for example, by adjusting the output voltage of the power converter such that output-side current decays to zero as quickly as possible. Once said time interval has elapsed, the values, which are supplied to the computation device 54 and continually measured by a measuring device 52, of the current 50 flowing on the output side during operation of the device are evaluated.

Furthermore, once the first time interval has elapsed, a time function for a second time interval is started. Within the second time interval, it is checked whether the current 50 flowing on the output side has decayed below a safety-critical limit value, with the result that the driving moment of the drive device is zero or close to zero.

In the event that such a decay occurs after the second time interval of, for example, 100 ms has elapsed, actuation of the interruption devices 38, 40 provided on the input side and output side is omitted because this is not relevant to safety. Only the pulsed signals and current-direction signals are suppressed.

However, in the event that the current 50 flowing on the output side has not yet decayed sufficiently in terms of safety after the second time interval has elapsed, opening of the interruption devices 38, 40 is initiated by the computation device 54 via a data connection which is not shown. As a result, the power converter 14 is electrically isolated from the power supply grid 34 and/or from the drive device 12. Thus, it is ensured that the current 50 flowing on the output side is finally interrupted and the driving moment of the direct-current drive 12 is reduced to zero. Therefore, in the event that the current flowing on the output side has also not decayed to zero after the second time interval has elapsed, the direct-current drive 12 is also disconnected for reasons of safety.

Figure 2:
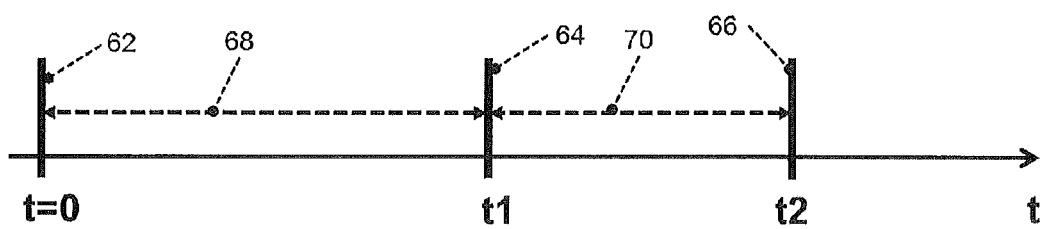
FIG. 2 shows an exemplary temporal profile in accordance with an exemplary embodiment of the present disclosure.

FIG. 2 shows an exemplary temporal profile in accordance with an exemplary embodiment of the present disclosure. As shown in FIG. 2, at an instant t0, denoted by the reference numeral 62, an STO signal is received by a power supply system. A time function for a first time interval 68 is started, the end of which occurs at an instant t1, which is denoted by the reference numeral 64. At the start of the first time interval, the trigger pulses of the actuation device 28, 30 are pushed into inverter limitation, such that a current on the output side can be reduced. In a subsequent second time interval 70, which extends until an instant t2, denoted by the reference numeral 66, it is checked whether the output-side current has fallen below a safety-critical value. If this is not the case by the instant t2, opening of respective interruption devices is initiated at the instant t2. Apart from that, exclusively the supply of actuation energy to the power converter in question is interrupted. The first time interval 68 is, for example, 400 ms while the second time interval 70 is, for example, 150 ms.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SIGNS

10 exemplary power supply system for a direct-current drive
12 direct-current drive
14 power converter
16 first semiconductor switch of the power converter
18 second semiconductor switch of the power converter
20 third semiconductor switch of the power converter
22 fourth semiconductor switch of the power converter
24 fifth semiconductor switch of the power converter
26 sixth semiconductor switch of the power converter
28 first part of the actuation device
30 second part of the actuation device
32 input-side connection
34 power supply grid
36 output-side connection
38 input-side interruption device
40 output-side interruption device
42 first input for current-direction signal
44 first input for pulsed signal
46 second input for current-direction signal
48 second input for pulsed signal
50 current flowing on the output side
52 measuring device
54 computation device
56 STO signal
60 exemplary temporal profile
62 instant of receiving an STO signal
64 instant of starting to check whether current has decayed
66 instant of finishing checking whether current has decayed
68 first time interval
70 second time interval

What is claimed is:

1. A power supply system for a direct-current drive, comprising:
    a power converter for at least one direction-dependent two-quadrant operating mode;
    at least one associated pulse-based actuation device;
    an input-side connection and an output-side connection for the power converter;
    at least one mechanical interruption device for at least one of the input-side connection and the output-side connection;

a first measuring device for detecting a respective first characteristic variable for the current flowing on the output side is provided on the output side, and a second measuring device on the input side for determining a respective second characteristic variable for the current flowing on the output side based on the measured values of said second measuring device, wherein the power supply system is provided to continually provide values of a current flowing on the output side during operation, and the power supply system is configured to:

receive a safe torque off (STO) signal, after receiving the safe torque off signal, immediately adjust the output voltage of the power converter such that the current flowing on the output side is brought down to zero or at least below a safety-critical limit value close to zero already within a first time interval, once the first time interval, which begins when the STO signal is received, has elapsed, at least one of interrupting the output of pulses to the power converter and interrupting the output of a current-direction signal to the power converter, with the result that a feed of actuation power through the actuation device into the power converter is interrupted, and supply an interruption signal to the at least one mechanical interruption device once a second subsequent time interval has elapsed and the current flowing on the output side has not decayed below a safety-critical limit value, wherein a logic AND operation of a respective undershoot of the first and the second characteristic variables is used as criterion for a decay of the current flowing on the output side below the safety-critical limit value.

2. The power supply system according to claim 1 wherein the power converter is provided for a four-quadrant operating mode.

3. The power supply system according to claim 1, wherein a decay of the current flowing on the output side below the safety-critical limit value is identified based on voltage measurements across the semiconductor switches of the power converter.

4. The power supply system according to claim 1, wherein said power supply system is provided on the input side for a three-phase infeed.

5. The power supply system according to claim 1, wherein said power supply system is provided to receive and to take into account two mutually independent STO signals.

6. The power supply system according to claim 1, wherein the first time interval is in the range from 50 ms to 500 ms.

7. A method for safety-related disconnection of a direct-current drive in a power supply system for a direct-current drive having a power converter for at least one direction-dependent two-quadrant operating mode with pulse-based actuation device, an input-side connection and an output-side connection for the power converter, at least one mechanical interruption device for at least one of the input-side connection and the output-side connection, a first measuring device for detecting a respective first characteristic variable for the current flowing on the output side is provided on the output side, and a second measuring device on the input side for determining a respective second characteristic variable for the current flowing on the output side based on the measured values of said second measuring device, wherein the power supply system is provided to continually provide values of the current flowing on the output side, and wherein a direct-current drive is connected to the power converter on the output side and is operated by said power converter, the method comprising:

receiving a safe torque off (STO) signal;

in the event of receiving a safe torque off (STO) signal, immediately adjusting the output voltage of the power converter such that the current flowing on the output side is brought down to zero or at least below a safety-critical limit value close to zero already within a first time interval;

once the first time interval, which begins when the STO signal is received, has elapsed, at least one of interrupting the output of pulses to the power converter and interrupting the output of a current-direction signal to the power converter, with the result that a feed of actuation power through the actuation device into the power converter is interrupted; and supplying an interruption signal to the at least one mechanical interruption device for precisely the case in which, once a second subsequent time interval has elapsed, the current flowing on the output side has not decayed below a safety-critical limit value, wherein a logic AND operation of a respective undershoot of the first and the second characteristic variables is used as criterion for a decay of the current flowing on the output side below the safety-critical limit value.

\* \* \* \* \*